Patented Feb. 7, 1950

2,496,414

UNITED STATES PATENT OFFICE 2,496,414

ANTHRAQUINONE DYESTUFFS

George W. Seymour and Clarence E. Hieserman, Cumberland, Md., assignors to Celanese Corporation of America, a corporation of Delaware No Drawing. Application August 21, 1946, Serial No. 692,139

16 Claims. (Cl. 260—380)

This invention relates to the preparation of anthraquinone dyestuffs having an excellent degree of affinity for cellulose acetate or other organic derivatives of cellulose and relates more particularly to the production of novel anthraquinone dyestuffs by an improved process involving the alkaline hydrolysis of anthraquinone dyestuffs containing a cyano group.

An object of this invention is the production of novel anthraquinone dyestuffs capable of dyeing cellulose acetate or other organic derivatives of cellulose in level shades which are fast to light and have superior resistance to acid fading.

Another object of this invention is the production of novel anthraquinone dyestuffs by the controlled aqueous hydrolysis of anthraquinone compounds containing a cyano group employing a buffered aqueous hydrolysis medium.

Other objects of this invention will appear from the following detailed description.

Anthraquinone dyestuffs having a satisfactory degree of affinity for organic derivative of cellulose textile materials and capable of dyeing said materials in deep, level blue shades which are highly resistant to light and acid fading have been the object of sustained dyestuff research. Some anthraquinone dyestuffs which dye cellulose acetate or other organic derivative of cellulose textile materials in desirable blue shades are satisfactory with respect to their resistance to light and washing, for example, but unsatisfactory with respect to their resistance to acid fading. Other such dyestuffs possess increased resistance to acid-fading but are unsuitable for commercial application because of other undesirable characteristics. Thus, the dyestuffs may be lacking in utility because noticeable changes in shade are observed depending on whether materials dyed with the dyestuffs are viewed by daylight or by artificial light. Furthermore, certain dyestuffs do not pile on sufficiently and dye in light shades only or, for example, may be undesirable for the reason that they produce dyeings which are not sufficiently level for commercial operations. Considerable effort has gone into attempts to develop anthraquinone dyestuffs which dye in blue shades and which do not exhibit any of these undesirable characteristics to a material degree.

We have now found that anthraquinone dyestuffs capable of dyeing in desirable level blue shades which are fast to light, neutral, i. e. unchanged, when viewed under artificial light and unusually resistant to acid-fading may be obtained by the controlled aqueous hydrolysis, under conditions of elevated temperature and pressure, of anthraquinone dyestuffs of the following general formula:

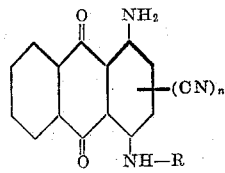

wherein $n$ is one or two and R is an alkyl, cycloalkyl, aryl or aralkyl group. Thus, the monovalent substituent R may be an alkyl group such as, for example, ethyl, methyl, propyl, butyl or amyl, a cycloalkyl group such as cyclohexyl, methylcyclohexyl or tetrahydrophenyl, an aryl group such as phenyl or tolyl, or an aralkyl group such as benzyl. These anthraquinone dyestuffs are well known in the art and may be readily obtained by reacting anthraquinone sulfonic acids of the following formula:

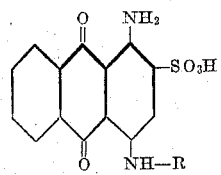

wherein R is the same as above, with a water-soluble salt of hydrocyanic acid, such as sodium cyanide, potassium cyanide or ammonium cyanide. The reaction is effected in aqueous solution at elevated temperature. The cyano groups enter the anthraquinone molecule in the 2- and/or 3-position and the sulfo group is split off, yielding a mixture of dyestuffs containing one or more cyano groups. While this mixture may be separated into the several different dyestuff components present therein and each hydrolyzed separately, we preferably subject the mixture itself to hydrolysis to produce the improved dyestuffs of our invention.

In accordance with our novel process, the improved anthraquinone dyestuffs are obtained if said mixture of anthraquinone nitrile compounds is subjected to controlled hydrolysis at a temperature of 140 to 150° C., under the autogenous pressure developed by conducting said reaction in a suitable autoclave, employing an aqueous hydrolysis medium maintained at a pH of between 8 and 9 by suitable buffers. Optimum results are obtained by employing a temperature of about 145° C. to effect said controlled hydrolysis.

By hydrolyzing said cyano-substituted anthraquinone dyestuffs and controlling the course of the hydrolysis in accordance with the conditions given above, the cyano group or groups which are present remain unchanged but the primary amino group in the 1-position is hydrolyzed and replaced by a hydroxy group. The final hydrolysis product obtained apparently comprises a mixture of several dyestuff products, namely, a mono-cyano and di-cyano fraction in which the 1-amino group originally present has been hydrolyzed to a hydroxy group and a fraction which appears to be unchanged 1-amino mono-cyano dyestuff.

The relative proportion of the several fractions in the final hydrolysis product depends upon the temperature at which the reaction is carried out and the length of time the anthraquinone nitrile compounds are subjected to the hydrolyzing conditions. Thus, at temperatures below 140° C. little or no hydrolysis takes place while at temperatures above 150° C. considerable loss in yield takes place due to conversion of the dyestuffs undergoing hydrolysis to a water-soluble product of unidentified structure. The temperature appears to be quite critical.

Where, for example, it is desired to hydrolyze only the dicyano component which is of a greenish cast and retain the major portion of the blue mono-cyano component, the reaction mixture should be brought up to reaction temperature, say 145° C., and then immediately cooled. Where a blue color of maximum affinity is desired, the hydrolysis may be continued for up to about 2 hours. Prolonging the hydrolysis beyond about 2 hours does not seriously affect the color of the resulting dyes but does decrease the yield, since continued hydrolysis, as stated above, converts the blue hydrolysis product originally formed to a red water-soluble dyestuff.

The pH of the aqueous medium employed for effecting the hydrolysis should be between 8 and 9. The desired pH is maintained by buffering the aqueous hydrolysis medium employing sodium bicarbonate for example, as the buffer. It is essential to maintain the correct pH to obtain dyestuffs of the desired properties. Hydrolysis in neutral solution yields a product which does not possess the desired properties while effecting the hydrolysis in an acid solution, on the other hand, yields a very green dyestuff of poor light fastness. The quantity of the aqueous liquid present during hydrolysis may be quite small so that as thick a paste as may be stirred efficiently is usually employed.

We have also found that the addition to the reaction medium of from 5 to 10% on the weight of the anthraquinone dyestuff undergoing hydrolysis, of a cellular diatomaceous silica material such as that widely employed industrially as a filter aid enables the hydrolyzed dyestuff to be solidified, after hydrolysis is completed, in the form of easily filtered and washable pellets. The reaction mixture is stirred during hydrolysis, and if stirring is continued following the completion of the hydrolysis while the reaction mass cools, discrete dyestuff pellets are formed. Preferably, stirring is continued until a temperature is reached where the pellets thus formed have hardened sufficiently to prevent aggregation. The major portion of the diatomaceous silica material remains in the reaction liquor with less than 1% being retained by the solidified dyestuff pellets. The cellular diatomaceous silica material is removed when the dyestuff pellets are separated from the reaction liquor by a suitable screening step, the solidified dyestuff pellets remaining on the screen while the reaction liquor and diatomaceous silica material pass through.

The hydrolysis of said mixed anthraquinone nitriles not only changes the chemical constitution of said compounds but also effects a pronounced change in their physical form. The original compounds are of a definite crystalline form which are not too easily dispersed, while our novel hydrolyzed product is amorphous in structure and is easily dispersed to yield level dyeings.

In order further to illustrate our invention but without being limited thereto, the following example is given:

*Example*

A water paste containing 450 parts by weight of a mixture consisting of about 90% of 1-amino-2(3)-cyano-4-butylamino anthraquinone and 10% of 1-amino-2-3-dicyano-4-butylamino-anthraquinone, which is obtained by reacting 1-amino-2-sulfo-4-butylamino-anthraquinone with potassium cyanide in the manner known to the art, is placed in a stirring autoclave and 2300 parts by weight of water, 100 parts by weight of sodium bicarbonate and 25 parts by weight of a diatomaceous silica material, such as that sold commercially under the name "Filtercel," are added. The autoclave is heated to 145° C. while stirring and is maintained at this temperature for 2 hours. The pH of the solution at the completion of the reaction is 8.6. The contents of the autoclave are then allowed to cool while stirring is continued until the reaction mixture has cooled to room temperature. The autoclave is opened and the pelletized dyestuff is then emptied on to a 40-mesh screen. The screen retains the dyestuff pellets but allows the reaction liquor together with the diatomaceous silica to pass through. Any dyestuff particles passing through the screen are then collected by screening the reaction liquor again, employing an 80-mesh sieve. The dyestuff pellets are then washed with water, and washing is continued until the color of the wash solution becomes pale pink in color.

The hydrolyzed dyestuff obtained does not contain any of the 1-amino-2-3-dicyano-4-butyl-amino-anthraquinone originally present, said compound being converted to 1-hydroxy-2-3-dicyano-4-butylamino-anthraquinone. The 1-amino-2(3)-cyano-4-butylamino-anthraquinone is converted in part to 1-hydroxy-2(3)-cyano-4-butylamino-anthraquinone, the remainder being unchanged. The hydrolyzed dyestuff product is highly amorphous in physical structure and, without further separation or purification may be employed to dye cellulose acetate materials in very desirable blue shades. Dyeing may be effected at a lower temperature and at a faster rate than when the unhydrolyzed dyestuff is employed. Level dyeings are readily obtained and the dyestuff shows excellent affinity and pile-on value. The blue dyeings produced undergo little change in shade under artificial light and no difficulty is experienced due to the development of shaded selvages. Cellulose acetate material dyed with said hydrolyzed, mixed dyestuff product suffers little or no change in shade when exposed to ultra-violet light for 50 hours in the "Fadeometer." The dyeings on cellulose acetate are extremely resistant to acid fading, no change being observed when the dyed sample is exposed for 1 unit of time and only a slight dulling being observed when dyed samples are exposed to an acid atmosphere for 2 units of time by the A. A. T. C. C. acid-fading test procedure. A unit of time, in accordance with said test, is defined by the period of time necessary to fade a sample of cellulose acetate dyed with 1.0% "Celanthrene Brilliant Blue FFS" to a predetermined red shade under the conditions employed. Exposure of a sample under test to the same conditions for the same period without change represents an acid-fading resistance of 1 unit. Continued exposure for an additional period without change, for example, represents a resistance of 2 units, etc.

It is to be understood that the foregoing detailed description is given merely by way of illustration and that many variations may be made therein without departing from the spirit of our invention.

Having described our invention what we desire to secure by Letters Patent is:

1. Process for the production of improved dyestuffs, which comprises subjecting anthraquinone compounds of the following formula:

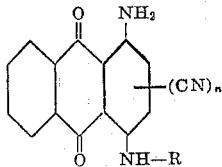

wherein $n$ is a whole number not greater than two and R is selected from the group consisting of alkyl, cycloalkyl, aryl and aralkyl groups, to hydrolysis at a temperature of from 140 to 150° C. under autogenous pressure in a buffered aqueous hydrolysis medium maintained at a pH of 8 to 9.

2. Process for the production of improved dyestuffs, which comprises subjecting anthraquinone compounds of the following formula:

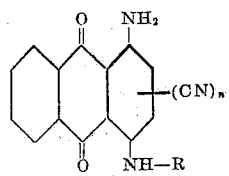

wherein $n$ is a whole number not greater than two and R is selected from the group consisting of alkyl, cycloalkyl, aryl and aralkyl groups, to hydrolysis at a temperature of from 140 to 150° C. under autogenous pressure for at most about two hours in a buffered aqueous hydrolysis medium maintained at a pH of 8 to 9.

3. Process for the production of improved dyestuffs, which comprises subjecting anthraquinone compounds of the following formula:

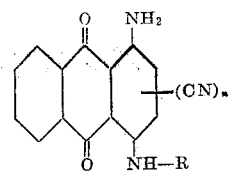

wherein $n$ is a whole number not greater than two and R is selected from the group consisting of alkyl, cycloalkyl, aryl and aralkyl groups, to hydrolysis at a temperature of from 140 to 150° C. under autogenous pressure employing an aqueous solution of sodium bicarbonate having a pH of 8 to 9 as the hydrolysis medium.

4. Process for the production of improved dyestuffs, which comprises subjecting anthraquinone compounds of the following formula:

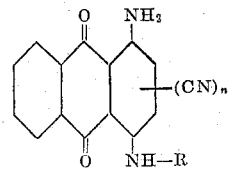

wherein $n$ is a whole number not greater than two and R is selected from the group consisting of alkyl, cycloalkyl, aryl and aralkyl groups, to hydrolysis at a temperature of from 140 to 150° C. under autogenous pressure for at most about two hours employing an aqueous solution of sodium bicarbonate having a pH of 8 to 9 as the hydrolysis medium.

5. Process for the production of improved dyestuffs, which comprises subjecting anthraquinone compounds of the following formula:

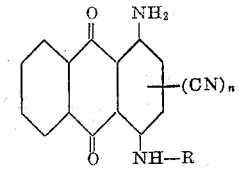

wherein $n$ is a whole number not greater than two and R is selected from the group consisting of alkyl, cycloalkyl, aryl and aralkyl groups, to hydrolysis at a temperature of from 140 to 150° C. under autogenous pressure in a buffered aqueous hydrolysis medium maintained at a pH of 8 to 9 containing a diatomaceous silica material, stirring the reaction mixture during hydrolysis and continuing said stirring while the reaction mixture cools, whereby the hydrolyzed product solidifies in the form of discrete pellets.

6. Process for the production of improved dyestuffs, which comprises subjecting anthraquinone compounds of the following formula:

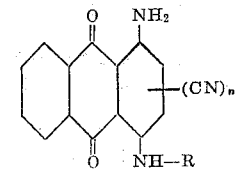

wherein $n$ is a whole number not greater than two and R is selected from the group consisting of alkyl, cycloalkyl, aryl and aralkyl groups, to hydrolysis at a temperature of from 140 to 150° C. under autogenous pressure for at most about two hours in a buffered aqueous hydrolysis medium maintained at a pH of 8 to 9 containing a diatomaceous silica material, stirring the reaction mixture during hydrolysis and continuing said stirring while the reaction mixture cools, whereby the hydrolyzed product solidifies in the form of discrete pellets.

7. Process for the production of improved dyestuffs, which comprises subjecting anthraquinone compounds of the following formula:

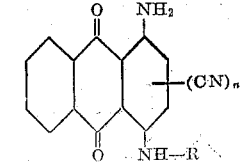

wherein $n$ is a whole number not greater than two and R is selected from the group consisting of alkyl, cycloalkyl, aryl and aralkyl groups, to hydrolysis at a temperature of from 140 to 150° C. under autogenous pressure employing an aqueous solution of sodium bicarbonate having a pH of 8 to 9 and containing a diatomaceous silica material as the hydrolysis medium, stirring the reaction mixture during hydrolysis and continuing said stirring while the reaction mixture cools, whereby the hydrolyzed product solidifies in the form of discrete pellets.

8. Process for the production of improved dyestuffs, which comprises subjecting anthraquinone compounds of the following formula:

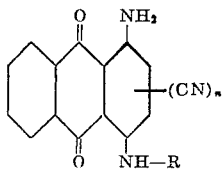

wherein $n$ is a whole number not greater than two and R is selected from the group consisting of alkyl, cycloalkyl, aryl and aralkyl groups, to hydrolysis at a temperature of from 140 to 150° C. under autogenous pressure for at most about two hours employing an aqueous solution of sodium bicarbonate having a pH of 8 to 9 and containing a diatomaceous silica material as the hydrolysis medium, stirring the reaction mixture during hydrolysis and continuing said stirring while the reaction mixture cools, whereby the hydrolyzed product solidifies in the form of discrete pellets.

9. Process for the production of improved dyestuffs, which comprises subjecting anthraquinone compounds of the following formula:

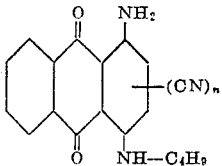

wherein $n$ is a whole number not greater than two, to hydrolysis at a temperature of 140 to 150° C. under autogenous pressure in a buffered aqueous hydrolysis medium maintained at a pH of 8 to 9.

10. Process for the production of improved dyestuffs, which comprises subjecting anthraquinone compounds of the following formula:

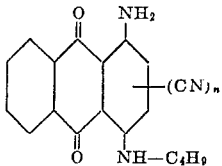

wherein $n$ is a whole number not greater than two, to hydrolysis at a temperature of 140 to 150° C. under autogenous pressure for at most about two hours in a buffered aqueous hydrolysis medium maintained at a pH of 8 to 9.

11. Process for the production of improved dyestuffs, which comprises subjecting anthraquinone compounds of the following formula:

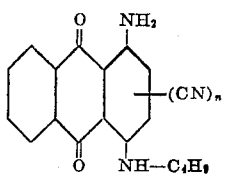

wherein $n$ is a whole number not greater than two, to hydrolysis at a temperature of 140 to 150° C. under autogenous pressure employing an aqueous solution of sodium bicarbonate having a pH of 8 to 9 as the hydrolysis medium.

12. Process for the production of improved dyestuffs, which comprises subjecting anthraquinone compounds of the following formula:

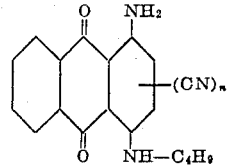

wherein $n$ is a whole number not greater than two, to hydrolysis at a temperature of 140 to 150° C. under autogenous pressure for at most about two hours employing an aqueous solution of sodium bicarbonate having a pH of 8 to 9 as the hydrolysis medium.

13. Process for the production of improved dyestuffs, which comprises subjecting anthraquinone compounds of the following formula:

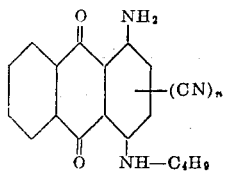

wherein $n$ is a whole number not greater than two, to hydrolysis at a temperature of 140 to 150° C. under autogenous pressure in a buffered aqueous hydrolysis medium maintained at a pH of 8 to 9 and containing a diatomaceous silica material, stirring the reaction mixture during hydrolysis and continuing said stirring while the reaction mixture cools, whereby the hydrolyzed product solidifies in the form of discrete pellets.

14. Process for the production of improved dyestuffs, which comprises subjecting anthraquinone compounds of the following formula:

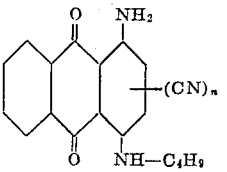

wherein $n$ is a whole number not greater than two, to hydrolysis at a temperature of 140 to 150° C. under autogenous pressure for at most about two hours in a buffered aqueous hydrolysis medium maintained at a pH of 8 to 9 and containing a diatomaceous silica material, stirring the reaction mixture during hydrolysis and continuing said stirring while the reaction mixture cools, whereby the hydrolyzed product solidifies in the form of discrete pellets.

15. Process for the production of improved dyestuffs, which comprises subjecting anthraquinone compounds of the following formula:

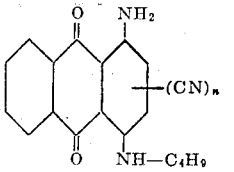

wherein $n$ is a whole number not greater than two, to hydrolysis at a temperature of 140 to 150° C. under autogenous pressure employing an aqueous solution of sodium bicarbonate having a pH of 8 to 9 and containing a diatomaceous silica material as the hydrolysis medium, stirring the reaction mixture during hydrolysis and continuing said stirring while the reaction mixture cools, whereby the hydrolyzed product solidifies in the form of discrete pellets.

16. Process for the production of improved dyestuffs, which comprises subjecting anthraquinone compounds of the following formula:

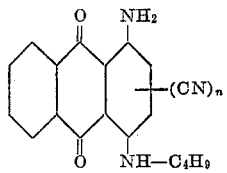

wherein $n$ is a whole number not greater than two, to hydrolysis at a temperature of 140 to 150° C. under autogenous pressure for at most about two hours employing an aqueous solution of sodium bicarbonate having a pH of 8 to 9 and containing a diatomaceous silica material as the hydrolysis medium, stirring the reaction mixture during hydrolysis and continuing said stirring while the reaction mixture cools, whereby the hydrolyzed product solidifies in the form of discrete pellets.

GEORGE W. SEYMOUR.
CLARENCE E. HIESERMAN.

REFERENCES CITED

The following references are of record in the file of this patent:

UNITED STATES PATENTS

| Number | Name | Date |
|---|---|---|
| 1,894,191 | Nawiasky et al. | Jan. 10, 1933 |
| 1,895,100 | Kranzlein et al. | Jan. 24, 1933 |
| 1,938,029 | Kugel | Dec. 5, 1933 |
| 2,168,947 | Zerweck et al. | Aug. 8, 1939 |

FOREIGN PATENTS

| Number | Country | Date |
|---|---|---|
| 243,788 | Germany | Feb. 22, 1912 |
| 359,850 | Great Britain | Oct. 29, 1931 |

OTHER REFERENCES

Marschalk: "Bull. Soc. Chim. France," 5th series, vol. 2, pages 1827–1829 (1935).

Perry: "Chemical Engineers' Handbook" (2nd edition 1941), page 1662.

Houben: "Die Methoden der Organischen Chemie" (3rd ed. 1941) (volume 4, page 21).

Fieser and Fieser: "Organic Chemistry" (1944), pages 170–171.

Migrdichian: "The Chemistry of Organic Cyanogen Compounds" (1917), page 37.